US011016343B2

(12) United States Patent
Yu et al.

(10) Patent No.: US 11,016,343 B2
(45) Date of Patent: May 25, 2021

(54) DIRECT TYPE BACKLIGHT MODULE AND LIQUID CRYSTAL DISPLAY DEVICE

(71) Applicant: Huizhou China Star Optoelectronics Technology Co., Ltd., Huizhou (CN)

(72) Inventors: Gang Yu, Huizhou (CN); Dehua Li, Huizhou (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 41 days.

(21) Appl. No.: 16/097,622

(22) PCT Filed: Sep. 12, 2018

(86) PCT No.: PCT/CN2018/105333
§ 371 (c)(1),
(2) Date: Oct. 30, 2019

(87) PCT Pub. No.: WO2019/205427
PCT Pub. Date: Oct. 31, 2019

(65) Prior Publication Data
US 2021/0096428 A1    Apr. 1, 2021

(30) Foreign Application Priority Data

Apr. 26, 2018 (CN) .......................... 201810388430.3

(51) Int. Cl.
*G02F 1/13357* (2006.01)
(52) U.S. Cl.
CPC .. *G02F 1/133608* (2013.01); *G02F 1/133606* (2013.01)

(58) Field of Classification Search
CPC ..................... G02F 1/133608; G02F 1/133606
USPC ..................................................... 349/61–71
See application file for complete search history.

(56) References Cited

U.S. PATENT DOCUMENTS

2015/0338571 A1* 11/2015 Jun ...................... G02B 6/0088
362/97.1

FOREIGN PATENT DOCUMENTS

| CN | 1979304 A    | 6/2007  |
| CN | 101158772 A  | 4/2008  |
| CN | 102182989 A  | 9/2011  |
| CN | 102767761 A  | 11/2012 |
| CN | 205405024 U  | 7/2016  |
| KR | 20070060445 A| 6/2007  |

(Continued)

*Primary Examiner* — Charles S Chang
(74) *Attorney, Agent, or Firm* — Leong C. Lei

(57) ABSTRACT

Provided are a direct type backlight module and a liquid crystal display device. The direct type backlight module comprises: a back frame, a backlight source disposed in the back frame and an optical frame disposed relatively spaced from the backlight source; a top edge and two side edges of the back frame are respectively and fixedly connected with a top edge and two side edges of the optical film, and a bottom edge of the back frame is elastically connected with a bottom edge of the optical film. By elastically connecting the bottom edge of the back frame and the bottom edge of the optical film, the optical film is flattened by an elastic force generated by the elastic connection to avoid the collapse of the optical film. Thus, the diffuser can be eliminated and the thickness of the backlight module can be decreased to lower the production cost.

14 Claims, 6 Drawing Sheets

(56) References Cited

FOREIGN PATENT DOCUMENTS

| | | | |
|---|---|---|---|
| TW | 200815869 | A | 4/2008 |
| TW | I320120 | B | 2/2010 |

* cited by examiner

DIRECT TYPE BACKLIGHT MODULE AND LIQUID CRYSTAL DISPLAY DEVICE

FIELD OF THE INVENTION

The present invention relates to a display field, and more particularly to a direct type backlight module and a liquid crystal display device.

BACKGROUND OF THE INVENTION

With the development of display technology, the flat panel device, such as Liquid Crystal Display (LCD) possesses advantages of high image quality, power saving, thin body and wide application scope. Thus, it has been widely applied in various consumer electrical products, such as mobile phone, television, personal digital assistant, digital camera, notebook, laptop, and becomes the major display device.

Most of the liquid crystal displays on the present market are back light type liquid crystal display devices, which comprise a liquid crystal display panel and a back light module. The working principle of the liquid crystal panel is to locate liquid crystal molecules between two parallel glass substrates, and a plurality of vertical and horizontal tiny electrical wires are between the two glass substrates. The light of back light module is reflected to generate images by applying driving voltages to control whether the liquid crystal molecules to be changed directions.

Because the liquid crystal display panel itself does not emit light and needs the back light module to provide light source for normally showing images. Therefore, the backlight module is the key component of the liquid crystal display device. According to the different light source incident positions, the backlight module can be categorized into two kinds, the side light type backlight module and a direct light type backlight module. The direct light type backlight module is to arrange a backlight source, such as a cold cathode fluorescent lamp (CCFL) or a light emitting diode (LED) light source behind the liquid crystal panel. After the light is homogenized by the diffusion sheet, a flat light source is formed and is provided to the liquid crystal panel.

The direct type backlight module has advantages of high cost performance and good optical stability. The direct light type backlight module of prior art generally includes: a back frame, a backlight source disposed in the back frame, an optical frame disposed relatively spaced from the backlight source and a diffuser disposed under the optical frame; the optical film includes a prism sheet and a diffusion sheet (different from a diffuser, and the diffusion sheet is in a film shape and does not have a supporting function), which both are components for improving light transmission of backlight source. The diffuser is used to diffuse the light emitted by the light source and is also used to support the optical film at the same time. However, the diffuser material is thick and the cost is high. If the diffuser is eliminated, the optical film will be collapsed downwards, which will result in the degradation of the quality of the backlight films.

SUMMARY OF THE INVENTION

An objective of the present invention is to provide a direct type backlight module, which can eliminate the diffuser and the lower production cost to achieve the thin backlight module on the premise of avoiding the collapse of the optical film.

Another objective of the present invention is to provide a liquid crystal display device, possessing the thin backlight module to realize the ultra-thin display.

For realizing the aforesaid objectives, the present invention provides a direct type backlight module, comprising: a back frame, a backlight source disposed in the back frame and an optical frame disposed relatively spaced from the backlight source;

a top edge and two side edges of the back frame are respectively and fixedly connected with a top edge and two side edges of the optical film, and a bottom edge of the back frame is elastically connected with a bottom edge of the optical film.

A plurality of engaging columns is respectively disposed on the top edge and the two side edges of the back frame, and a plurality of engaging holes is respectively disposed on the top edge and the two side edges of the optical film, and the plurality of engaging columns and the plurality of engaging holes are correspondingly engaged one to one, so that the top edge and the two side edges of the back frame are respectively and fixedly connected to the top edge and the two side edges of the optical film.

The direct type backlight module further comprises: a plurality of elastic hangers, wherein a plurality of hanging grooves are evenly disposed on the bottom edge of the back frame, and a plurality of hanging holes one to one corresponding to the plurality of hanging grooves are disposed on the bottom edge of the optical film, and two ends of each elastic hanger are connected with one hanging groove and one hanging hole, respectively, so that the bottom edge of the back frame is elastically connected with the bottom edge of the optical film.

The elastic hangers are S-shaped.

A material of the elastic hangers is rubber.

The hanging grooves are U-shaped grooves, and openings of the hanging grooves face an outside of the back frame, and the hanging holes are rectangular holes.

The direct type backlight module further comprises: a plurality of elastic ropes, wherein a plurality of winding posts evenly disposed on the bottom edge of the back frame, and a plurality of winding holes one to one corresponding to the plurality of winding posts are disposed on the bottom edge of the optical film, and each elastic rope is connected to one winding post and one winding hole, respectively, so that the bottom edge of the back frame is elastically connected with the bottom edge of the optical film.

A material of the elastic ropes is rubber.

The optical film comprises a prism sheet and a diffusion sheet, which are stacked.

The present invention further provides a liquid crystal display device including the aforesaid direct type backlight module.

The benefits of the present invention are: the present invention provides a direct type backlight module comprising: a back frame, a backlight source disposed in the back frame and an optical frame disposed relatively spaced from the backlight source; a top edge and two side edges of the back frame are respectively and fixedly connected with a top edge and two side edges of the optical film, and a bottom edge of the back frame is elastically connected with a bottom edge of the optical film. By elastically connecting the bottom edge of the back frame and the bottom edge of the optical film, the optical film is flattened by an elastic force generated by the elastic connection to avoid the collapse of the optical film. Thus, the diffuser can be eliminated and the thickness of the backlight module can be decreased to lower the production cost. The present invention further provides a liquid crystal display device, possessing the thin backlight module to realize the ultra-thin display.

BRIEF DESCRIPTION OF THE DRAWINGS

In order to better understand the characteristics and technical aspect of the invention, please refer to the following detailed description and accompanying drawings of the present invention. However, the drawings are provided for reference only and are not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
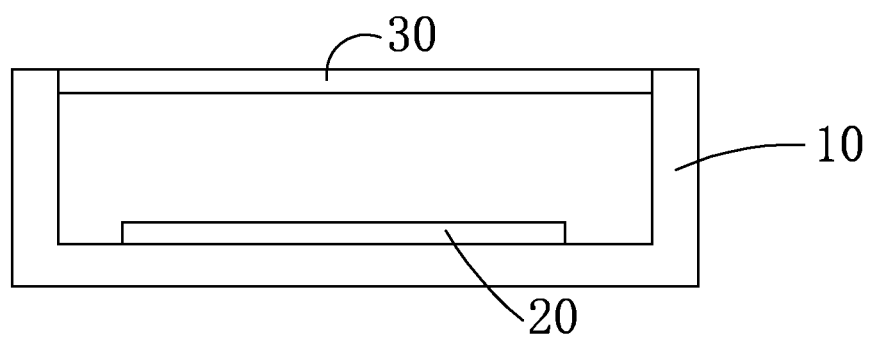
FIG. 1 is a sectional view diagram of a direct type backlight module of the present invention.

Please refer to FIG. 1. The present invention provides a direct type backlight module comprising: a back frame 10, a backlight source 20 disposed in the back frame 10 and an optical frame 30 disposed relatively spaced from the backlight source 20;

a top edge and two side edges of the back frame 10 are respectively and fixedly connected with a top edge and two side edges of the optical film 30, and a bottom edge of the back frame 10 is elastically connected with a bottom edge of the optical film 30.

Figure 2:
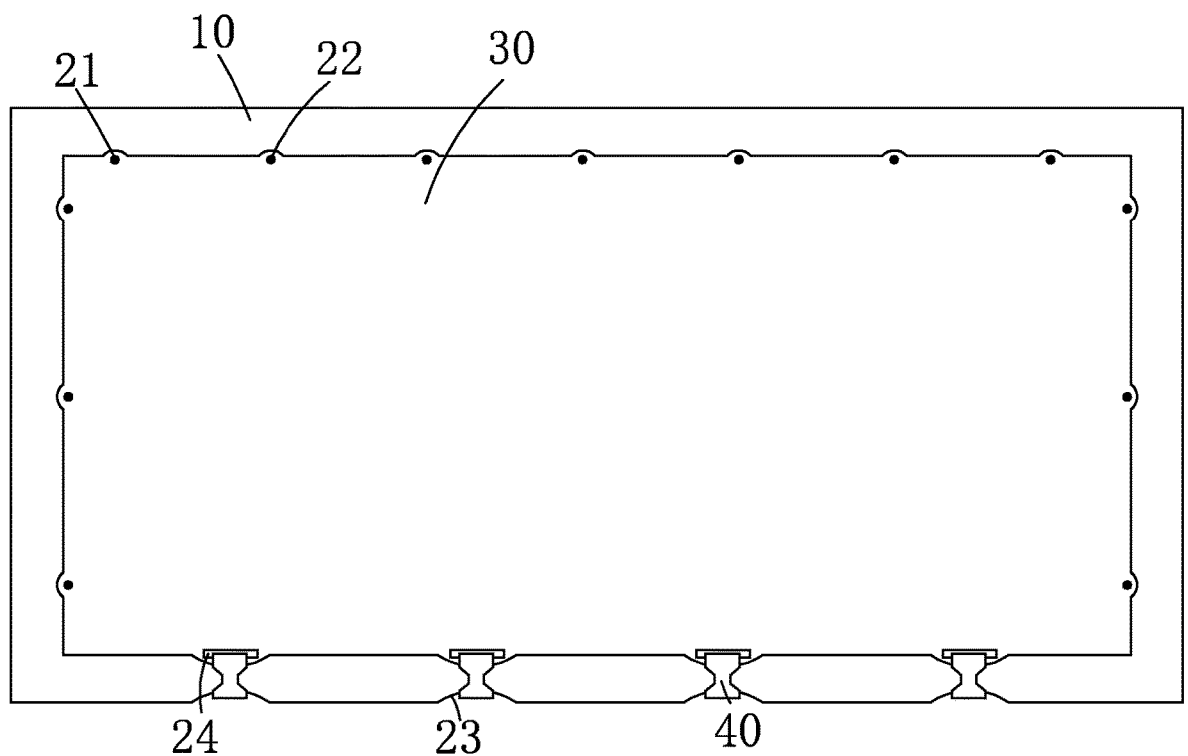
FIG. 2 is a top view diagram of the first embodiment of a direct type backlight module of the present invention.
Figure 5:
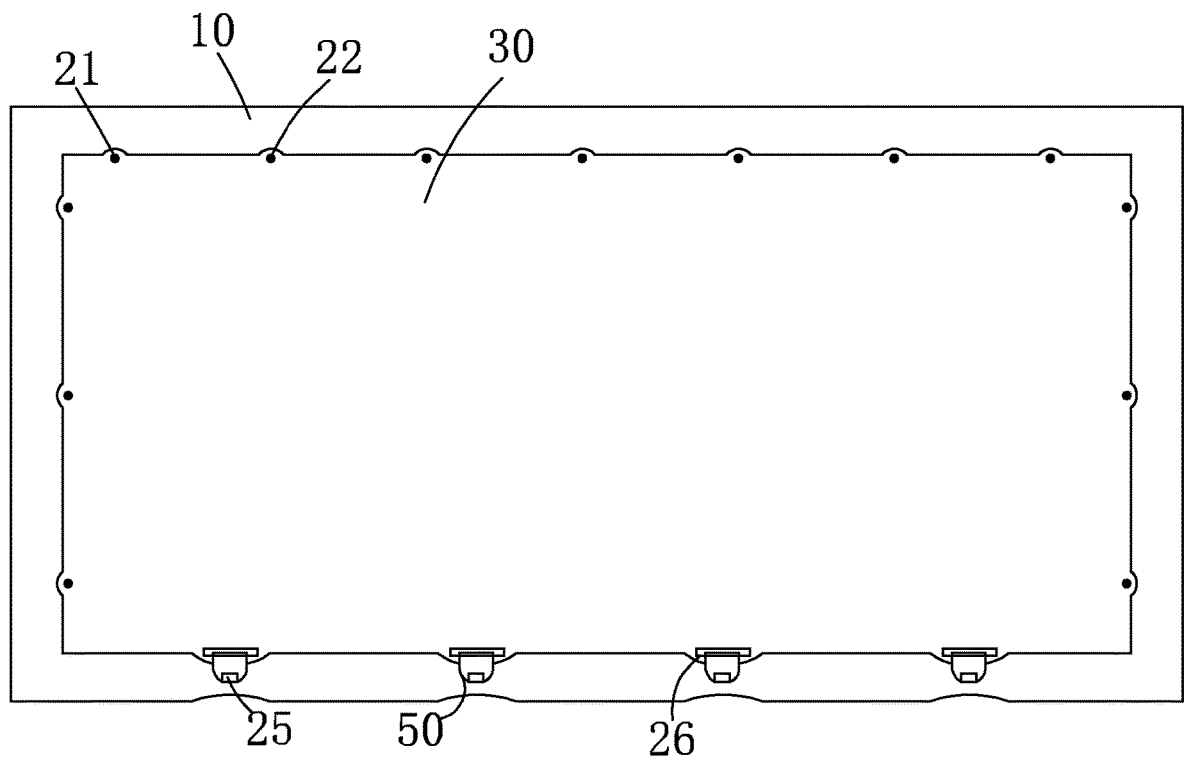
FIG. 5 is a top view diagram of the second embodiment of a direct type backlight module of the present invention.

Specifically, as shown in FIG. 2 or FIG. 5, a plurality of engaging columns 21 is respectively disposed on the top edge and the two side edges of the back frame 10, and a plurality of engaging holes 22 is respectively disposed on the top edge and the two side edges of the optical film 30, and the plurality of engaging columns 21 and the plurality of engaging holes 22 are correspondingly engaged one to one, so that the top edge and the two side edges of the back frame 10 are respectively and fixedly connected to the top edge and the two side edges of the optical film 30.

Figure 3:
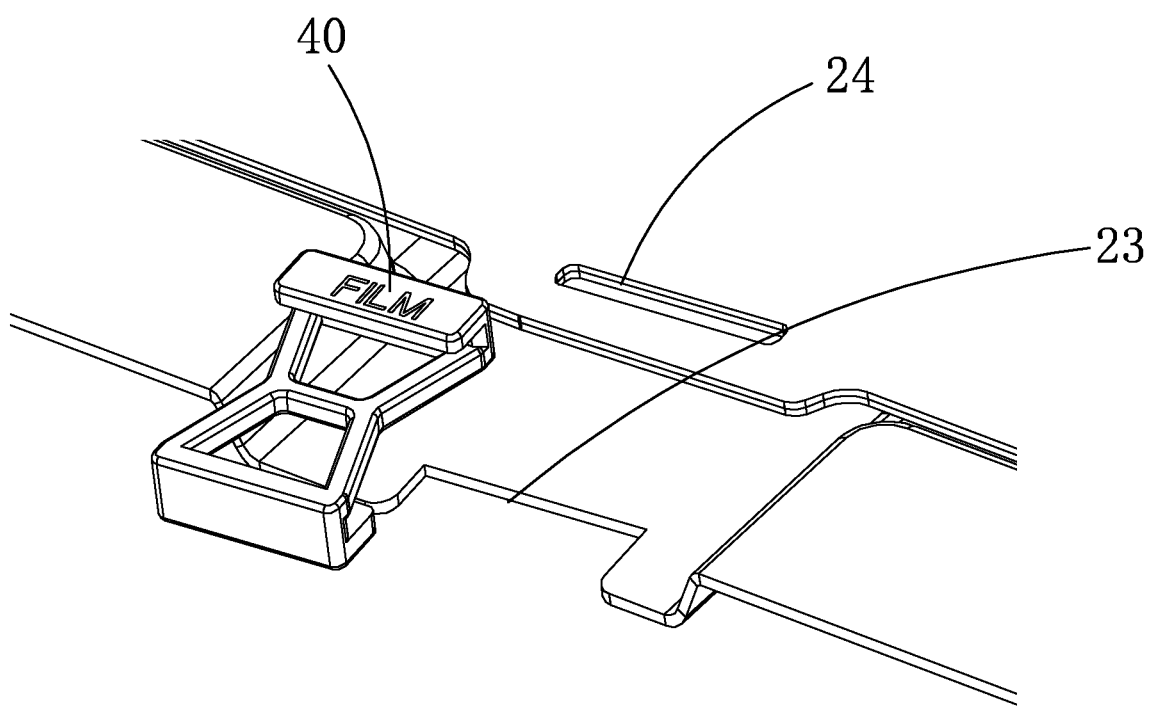
FIG. 3 is an exploded enlarged view diagram of a position of an elastic hanger in the first embodiment of the direct type backlight module of the present invention.
Figure 4:
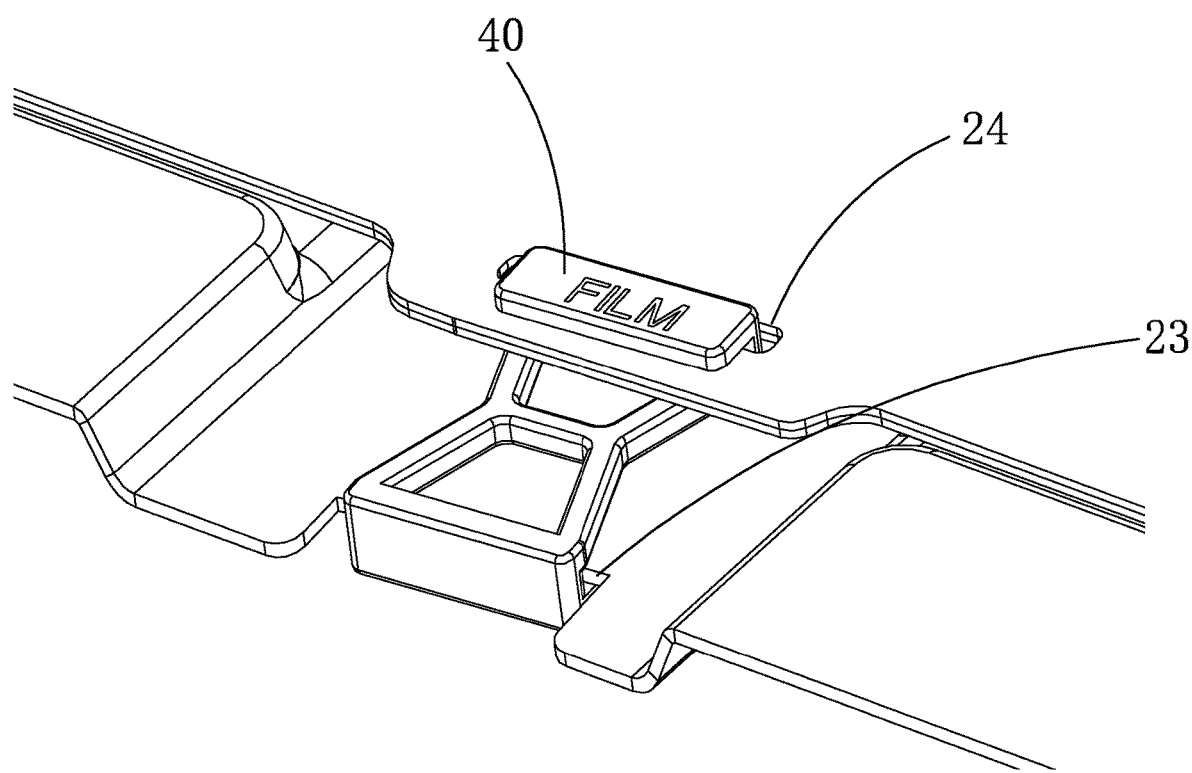
FIG. 4 is a combined enlarged view diagram of a position of an elastic hanger in the first embodiment of the direct type backlight module of the present invention.

Specifically, as shown in FIG. 2, FIG. 3 and FIG. 4, in the first embodiment of the present invention, the direct type backlight module further comprises: a plurality of elastic hangers 40, wherein a plurality of hanging grooves 23 are evenly disposed on the bottom edge of the back frame 10, and a plurality of hanging holes 24 one to one corresponding to the plurality of hanging grooves 23 are disposed on the bottom edge of the optical film 30, and two ends of each elastic hanger 40 are connected with one hanging groove 23 and one hanging hole 24, respectively, so that the bottom edge of the back frame 10 is elastically connected with the bottom edge of the optical film 30.

Preferably, in the first embodiment of the present invention, the elastic hangers 40 are S-shaped. The two ends of the elastic hanger 40 are respectively hung onto one hanging groove 23 and one hanging hole 24. The elastic hanger 40 is elongated so as to provide the optical film 30 with a pulling force after being hung. Thus, the optical film 30 is tensioned to prevent the optical film 30 from collapsing.

Preferably, a material of the elastic hangers 40 is rubber.

Preferably, the hanging grooves 23 are U-shaped grooves, and openings of the hanging grooves 23 face an outside of the back frame 10, and the hanging holes 24 are rectangular holes.

Figure 6:
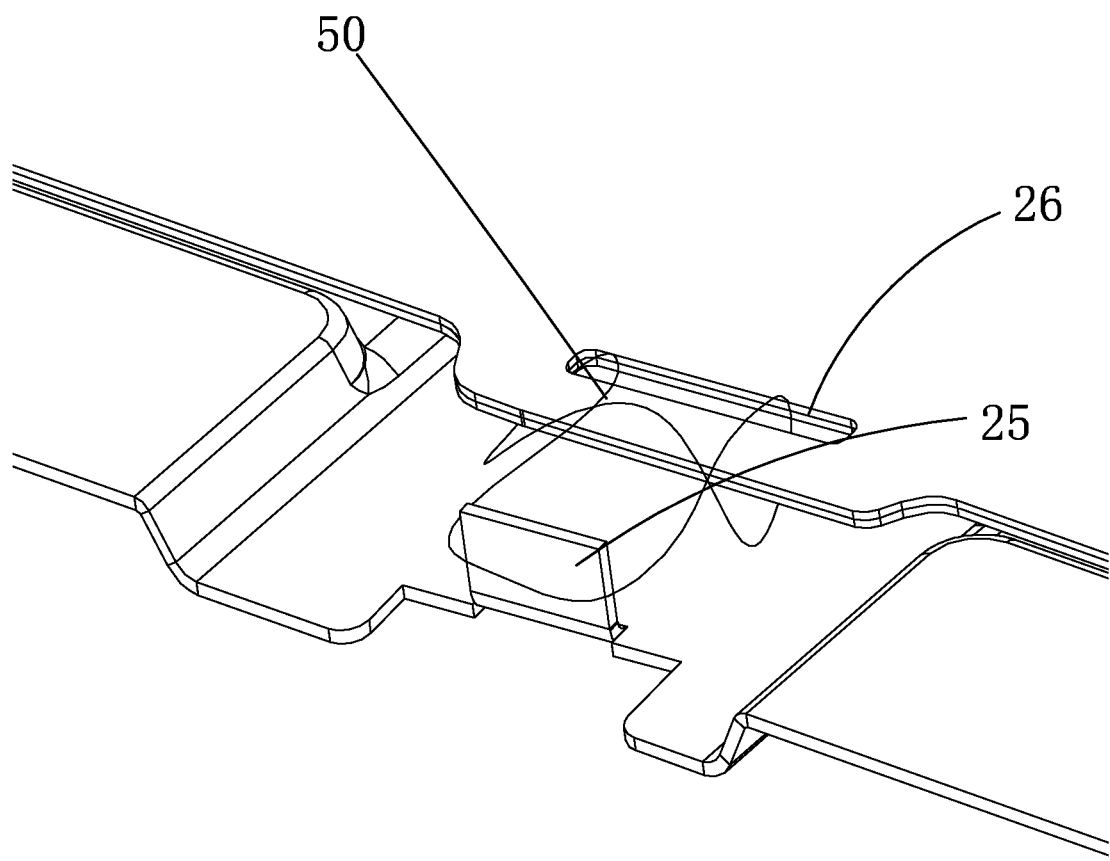
FIG. 6 is an enlarged view diagram of a position of an elastic rope in the second embodiment of the direct type backlight module of the present invention.

Specifically, as shown in FIG. 5 and FIG. 6, in the second embodiment of the present invention, the direct type backlight module further comprises: a plurality of elastic ropes 50, wherein a plurality of winding posts 25 evenly arranged on the bottom edge of the back frame 10, and a plurality of winding holes 26 one to one corresponding to the plurality of winding posts 25 are disposed on the bottom edge of the optical film 30, and each elastic rope 50 is connected to one winding post 25 and one winding hole 26, respectively, so that the bottom edge of the back frame 10 is elastically connected with the bottom edge of the optical film 30.

Specifically, a material of the elastic ropes 50 is rubber.

Specifically, in the second embodiment of the present invention, the elastic rope 50 encloses a closed pattern, and is sleeved on the winding post 25 after passing through the winding hole 26. The elastic rope 40 is stretched so as to provide the optical film 30 with a pulling force. Thus, the optical film 30 is tensioned to prevent the optical film 30 from collapsing.

Specifically, the optical film 30 comprises a prism sheet and a diffusion sheet, which are stacked.

Thus, in the direct type backlight module of the present invention, the bottom edge of the back frame 10 is configured to elastically connect with the bottom edge of the optical film 30. The elastic connection provides the optical film 30 with a pulling force. Thus, the optical film 30 is tensioned. It can be ensured that the optical film 30 will not collapse after eliminating the diffuser. Then, the thickness of the direct type backlight module can be decreased to reduce the production cost of the direct type backlight module.

Based on the aforesaid direct type backlight module, the present invention further provides a liquid crystal display device, comprising the aforesaid direct type backlight module. Furthermore, in some embodiments of the present invention, the liquid crystal display device comprises: the direct type backlight module, a front framed engaged with the direct type backlight module and a liquid crystal display panel disposed between the direct type backlight module and the front frame.

In conclusion, the present invention provides a direct type backlight module comprising: a back frame, a backlight source disposed in the back frame and an optical frame disposed relatively spaced from the backlight source; a top edge and two side edges of the back frame are respectively and fixedly connected with a top edge and two side edges of the optical film, and a bottom edge of the back frame is elastically connected with a bottom edge of the optical film. By elastically connecting the bottom edge of the back frame and the bottom edge of the optical film, the optical film is flattened by an elastic force generated by the elastic connection to avoid the collapse of the optical film. Thus, the diffuser can be eliminated and the thickness of the backlight module can be decreased to lower the production cost. The present invention further provides a liquid crystal display device, possessing the thin backlight module to realize the ultra-thin display.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A direct type backlight module, comprising: a back frame, a backlight source disposed in the back frame and an optical film disposed relatively spaced from the backlight source;
    a top edge and two side edges of the back frame are respectively and fixedly connected with a top edge and two side edges of the optical film, and a bottom edge of the back frame is elastically connected with a bottom edge of the optical film; and
    a plurality of elastic hangers, wherein a plurality of hanging grooves are evenly disposed on the bottom edge of the back frame, and a plurality of hanging holes one to one corresponding to the plurality of hanging grooves are disposed on the bottom edge of the optical film, and two ends of each elastic hanger are connected with one hanging groove and one hanging hole, respectively, so that the bottom edge of the back frame is elastically connected with the bottom edge of the optical film;
    wherein the elastic hangers are S-shaped.

2. The direct type backlight module according to claim 1, wherein a plurality of engaging columns is respectively disposed on the top edge and the two side edges of the back frame, and a plurality of engaging holes is respectively disposed on the top edge and the two side edges of the optical film, and the plurality of engaging columns and the plurality of engaging holes are correspondingly engaged one to one, so that the top edge and the two side edges of the back frame are respectively and fixedly connected to the top edge and the two side edges of the optical film.

3. The direct type backlight module according to claim 1, wherein a material of the elastic hangers is rubber.

4. The direct type backlight module according to claim 1, wherein the hanging grooves are U-shaped grooves, and openings of the hanging grooves face an outside of the back frame, and the hanging holes are rectangular holes.

5. The direct type backlight module according to claim 1, further comprising: a plurality of elastic ropes, wherein a plurality of winding posts evenly disposed on the bottom edge of the back frame, and a plurality of winding holes one to one corresponding to the plurality of winding posts are disposed on the bottom edge of the optical film, and each elastic rope is connected to one winding post and one winding hole, respectively, so that the bottom edge of the back frame is elastically connected with the bottom edge of the optical film.

6. The direct type backlight module according to claim 5, wherein a material of the elastic ropes is rubber.

7. The direct type backlight module according to claim 1, wherein the optical film comprises a prism sheet and a diffusion sheet, which are stacked.

8. A liquid crystal display device, comprising the directly type backlight module according to claim 1, wherein the direct type backlight module further comprises: a plurality of elastic hangers, and a plurality of hanging grooves are evenly disposed on the bottom edge of the back frame, and a plurality of hanging holes one to one corresponding to the plurality of hanging grooves are disposed on the bottom edge of the optical film, and two ends of each elastic hanger are connected with one hanging groove and one hanging hole, respectively, so that the bottom edge of the back frame is elastically connected with the bottom edge of the optical film, and wherein the elastic hangers are S-shaped.

9. The liquid crystal display device according to claim 8, wherein a plurality of engaging columns is respectively disposed on the top edge and the two side edges of the back frame, and a plurality of engaging holes is respectively disposed on the top edge and the two side edges of the optical film, and the plurality of engaging columns and the plurality of engaging holes are correspondingly engaged one to one, so that the top edge and the two side edges of the back frame are respectively and fixedly connected to the top edge and the two side edges of the optical film.

10. The liquid crystal display device according to claim 8, wherein a material of the elastic hangers is rubber.

11. The liquid crystal display device according to claim 8, wherein the hanging grooves are U-shaped grooves, and openings of the hanging grooves face an outside of the back frame, and the hanging holes are rectangular holes.

12. The liquid crystal display device according to claim 8, wherein the direct type backlight module further comprises: a plurality of elastic ropes, and a plurality of winding posts evenly disposed on the bottom edge of the back frame, and a plurality of winding holes one to one corresponding to the plurality of winding posts are disposed on the bottom edge of the optical film, and each elastic rope is connected to one winding post and one winding hole, respectively, so that the bottom edge of the back frame is elastically connected with the bottom edge of the optical film.

13. The liquid crystal display device according to claim 12, wherein a material of the elastic ropes is rubber.

14. The liquid crystal display device according to claim 8, wherein the optical film comprises a prism sheet and a diffusion sheet, which are stacked.

* * * * *